US011673622B2

(12) United States Patent
Lin

(10) Patent No.: US 11,673,622 B2
(45) Date of Patent: Jun. 13, 2023

(54) SEAT POST ASSEMBLY CAPABLE OF ADJUSTING TOTAL HEIGHT

(71) Applicant: J.D COMPONENTS CO., LTD., Chang Hua Hsien (TW)

(72) Inventor: Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 0 days.

(21) Appl. No.: 17/357,512

(22) Filed: Jun. 24, 2021

(65) Prior Publication Data

US 2022/0041236 A1 Feb. 10, 2022

(30) Foreign Application Priority Data

Aug. 7, 2020 (TW) .................................. 109210223

(51) Int. Cl.
*B62J 1/08* (2006.01)
(52) U.S. Cl.
CPC ............ *B62J 1/08* (2013.01); *B62J 2001/085* (2013.01)
(58) Field of Classification Search
CPC ................................................ B62J 2001/085
See application file for complete search history.

(56) References Cited

U.S. PATENT DOCUMENTS

| 2018/0334212 | A1* | 11/2018 | Bowers | B62K 3/02 |
| 2019/0039669 | A1* | 2/2019 | McAndrews | B62K 19/18 |
| 2019/0233041 | A1* | 8/2019 | Watson | B62K 23/02 |
| 2021/0094642 | A1* | 4/2021 | Dubois | B62J 1/08 |
| 2021/0371028 | A1* | 12/2021 | Coaplen | B62J 1/08 |
| 2022/0306229 | A1* | 9/2022 | Dubois | B62J 1/08 |

FOREIGN PATENT DOCUMENTS

| CA | 3053537 A1 * | 2/2020 | B62J 1/08 |
| CN | 112606930 A * | 4/2021 | B62J 1/08 |
| EP | 3950471 A1 * | 2/2022 | B62J 1/08 |
| EP | 3957553 A1 * | 2/2022 | B62J 1/08 |

* cited by examiner

*Primary Examiner* — Timothy J Brindley
(74) *Attorney, Agent, or Firm* — Muncy Geissler Olds & Lowe P.C.

(57) ABSTRACT

A seat post assembly includes an outer tube and an inner tube movably disposed upwards and downwards in the outer tube. A bushing has an upper sleeve disposed on the top end of the outer tube and penetrated by the inner tube, and a lower sleeve movably mounted upwards and downwards on the inner tube. A connecting structure is disposed to the bushing for enabling the lower sleeve to be connected with the upper sleeve and moved along the axial direction of the outer tube relative to the upper sleeve. Further, the connecting structure allows the position of the lower sleeve relative to a protrusion of the inner tube to be adjustable. As such, when the bottom end of the lower sleeve is abutted against the protrusion of the inner tube, the inner tube cannot be raised to achieve the effect of adjusting the total height.

11 Claims, 9 Drawing Sheets

SEAT POST ASSEMBLY CAPABLE OF ADJUSTING TOTAL HEIGHT

BACKGROUND OF THE INVENTION

1. Field of the Invention

The present invention relates to a bicycle sear post and more particularly, to a seat post assembly that is capable of adjusting the total height.

2. Description of the Related Art

The height of the bicycle seat will affect comfort and safety of riding. The current structure is equipped with an adjustable seat post that can be operated to adjust the height of the seat according to the rider's body shape, rider's habits and riding environment, such that the adjustable seat post allows the rider to ride in the correct posture, thereby improving riding comfort and safety.

However, the inner tube can be lowered to achieve the effect of saving storage space of the adjustable seat post. After the inner tube is lowered, the height of the inner tube needs to be re-adjusted if the rider would like to use it on the next ride. The rider may spend a lot of time looking for a suitable height of the inner tube. This will cause inconvenience and trouble to the rider.

SUMMARY OF THE INVENTION

It is a primary objective of the present invention to provide a seat post assembly, which can be quickly adjusted by a rider to reach a desired height.

To attain the above objective, the seat post assembly of the present invention comprises an outer tube, an inner tube, a bushing, and a connecting structure. The inner tube is movably disposed upwards and downwards in the outer tube. The top end of the inner tube is located outside the outer tube and the bottom end of the inner tube is received in the outer tube. Further, the outer surface of the bottom end of the inner tube has a protrusion. The bushing includes an upper sleeve and a lower upper sleeve. The upper sleeve is disposed on the top end of the outer tube and penetrated by the inner tube. The lower sleeve is received in the outer tube and movably mounted upwards and downwards on the inner tube along the axial direction of the outer tube. Further, the bottom end of the lower sleeve is abutted against the protrusion of the inner tube. The connecting structure is provided to the bushing for enabling the lower sleeve to be connected with the upper sleeve and moved along the axial direction of the outer tube relative to the upper sleeve, and allowing the distance between the lower sleeve and the protrusion of the inner tube to be adjustable.

It can be understood from the above illustration that after the inner tube reaches a desired height, the position of the lower sleeve can be adjusted until the bottom end of the lower sleeve is abutted against the protrusion of the inner tube to complete the height adjustment of the inner tube. By this way, the inner tube can be quickly adjusted from a lower position to the desired height without repeated adjustments, so as to save operation time and increase the convenience of use.

Preferably, the connecting structure includes a plurality of positioning slots arranged in order along an axial direction of the inner tube, and at least one positioning portion alternatively engaged with one of the positioning slots.

Preferably, the positioning slots are provided by one of the upper sleeve and the lower sleeve, and the positioning portion is provided by the other of the upper sleeve and the lower sleeve.

Preferably, the positioning slots are arranged in a stepped manner along the axial direction of the inner tube. The connecting structure includes a plurality of the positioning portions arranged in a stepped manner along the axial direction of the inner tube and engaged with the positioning slots in a one-to-one manner.

Preferably, the upper sleeve includes an upper ring portion abutted against the top end surface of the outer tube and penetrated by the inner tube, and a sleeve portion extending downwards from the bottom edge of the upper ring portion along the axial direction of the inner tube. The positioning slots are provided by the sleeve portion.

Preferably, the sleeve portion of the upper sleeve has a guide slot extending upwards from the bottom edge of the sleeve portion around the axial direction of the inner tube and communicating with the positioning slots. The lower sleeve includes a lower ring portion movably mounted upwards and downwards on the inner tube and having a bottom edge thereof abutted against the protrusion of the inner tube, and a guide arm extending upwards from the top edge of the lower ring portion around the axial direction of the inner tube and inserted into the guide slot of the upper sleeve. The positioning portions are provided at the top side of the guide arm.

Preferably, the sleeve portion of the upper sleeve further includes a first inclined plane adjacent to the guide slot, and the guide arm of the lower sleeve includes a second inclined plane abutted against the first inclined plane. By this way, the lower sleeve can be moved smoothly.

Preferably, the positioning slots are disposed in pairs and arranged in an equally-spaced manner along the axial direction of the inner tube. The connecting structure includes one said position portion provided with two ends thereof engaged with one pair of the positioning slots.

Preferably, the upper sleeve includes an upper ring portion abutted against the top end surface of the outer tube and penetrated by the inner tube, and a sleeve portion extending downwards from the bottom edge of the upper ring portion along the axial direction of the inner tube. The positioning slots are provided by the sleeve portion.

Preferably, the sleeve portion of the upper sleeve further has a guide slot extending upwards from the bottom edge of the sleeve portion along the axial direction of the inner tube and communicating with the positioning slots. The lower sleeve includes a lower ring portion movably mounted upwards and downwards on the inner tube and having a bottom edge thereof abutted against the protrusion of the inner tube, and a guide arm extending upwards from the top edge of the lower ring portion along the axial direction of the inner tube and inserted into the guide slot of the upper sleeve. The positioning portion is provided at the top end of the guide arm.

Other advantages and features of the present invention will be fully understood by reference to the following specification in conjunction with the accompanying drawings, in which like reference signs denote like components of structure.

DETAILED DESCRIPTION OF THE INVENTION

Figure 1:
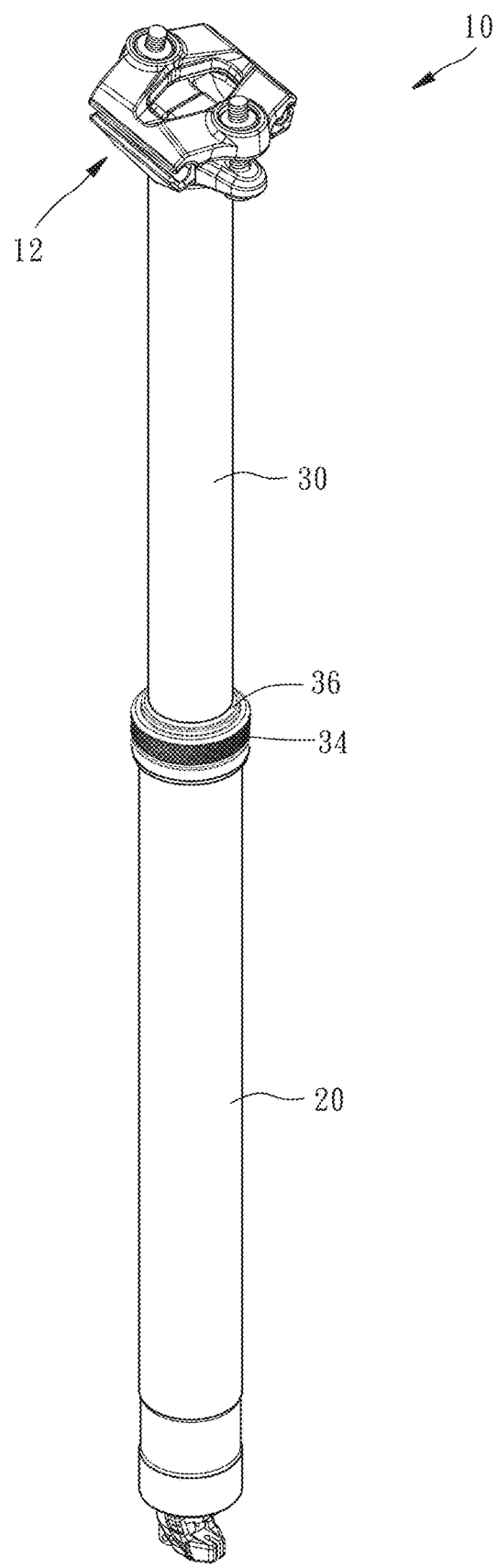
FIG. 1 is a perspective view of a seat post assembly according to a first embodiment of the present invention.
Figure 2:
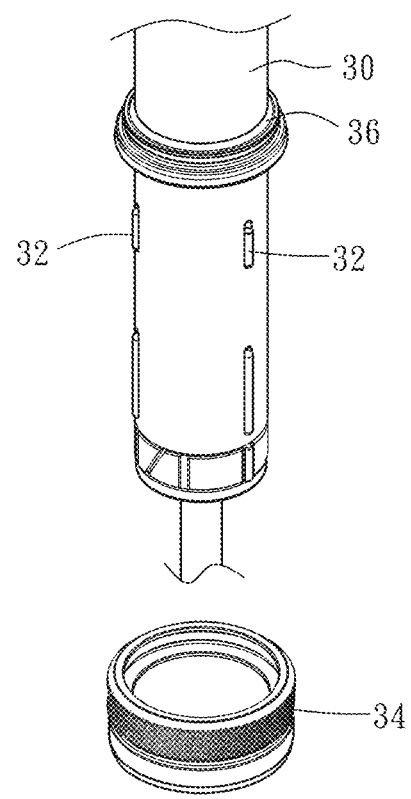
FIG. 2 is a partially exploded perspective view of the seat post assembly according to the first embodiment of the present invention.
Figure 2:
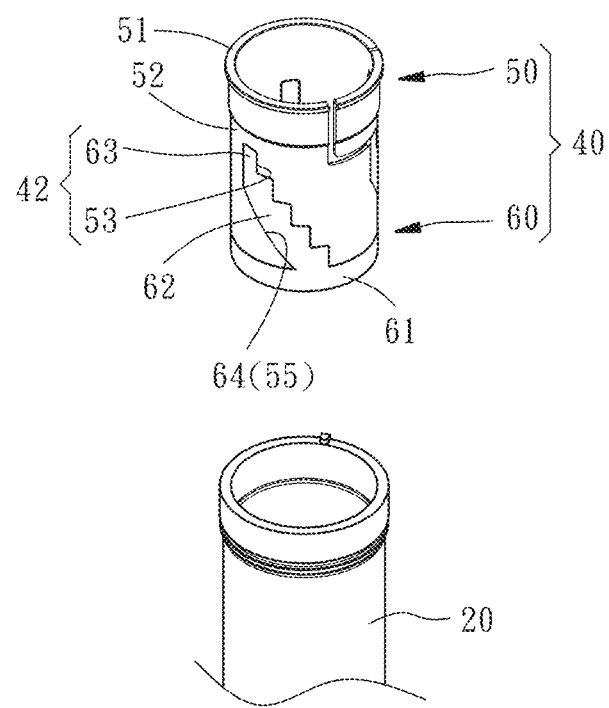

Referring to FIGS. 1 and 2, a seat post assembly 10 according to a first embodiment of the present invention comprises an outer tube 20, an inner tube 30, a cap 34, a bushing 40, and a connecting structure 42.

The top end of the inner tube 30 is located outside the outer tube 20 and equipped with a clamping seat 12 for mounting a seat cushion (not shown). The bottom end of the inner tube 30 penetrates into the outer tube 20 through the top end of the outer tube 20. The outer surface of the bottom end of the inner tube 30 has three straight protrusions 32 (actually, at least one is sufficient). The three protrusions 32 are arranged in an equally-spaced manner relative to the axis of the inner tube 30.

Figure 4:
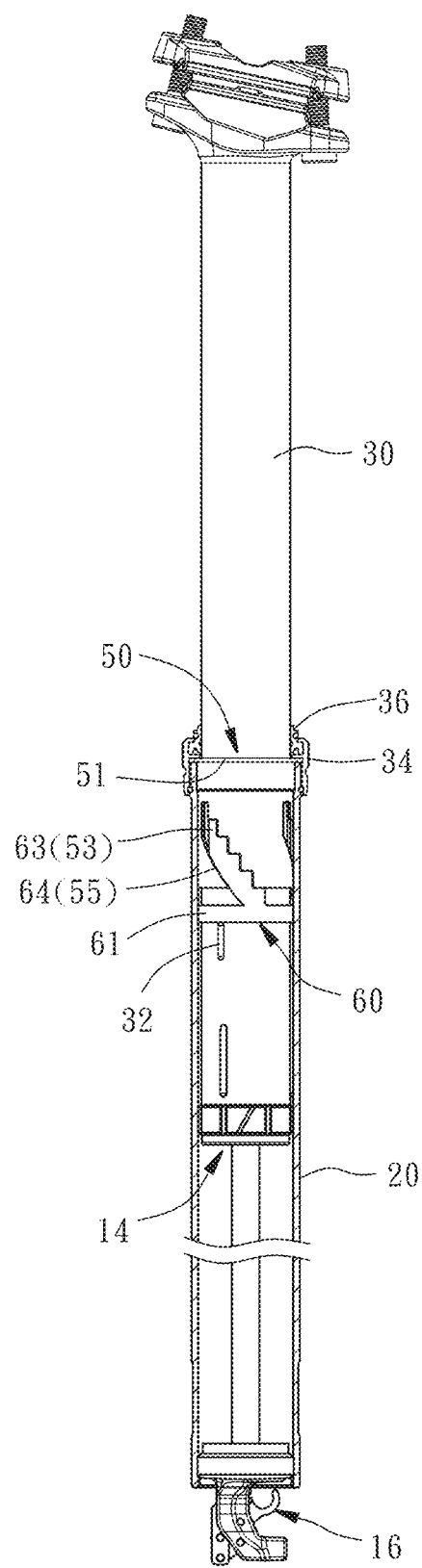
FIG. 4 is a partially sectional view of the seat post assembly according to the first embodiment of the present invention.

As shown in FIG. 4, a pneumatic cylinder 14 is disposed in the outer tube 20 and the inner tube 30, and a trigger 16 is provided at the bottom of the outer tube 20. When the trigger 16 is driven by a controller (not shown) to turn on the pneumatic bar 14, the inner tube 30 can be lifted or lowered relative to the outer tube 20. If the top end of the inner tube 30 does not bear the weight of the rider, the inner tube 30 will be lifted relative to the outer tube 20, but if the top end of the inner tube 30 bears the weight of the rider, the inner tube 30 will be lowered relative to the outer tube 20.

As shown in FIGS. 2 and 4, the cap 34 is screwed to the top end of the outer tube 20 to press a sealing ring 36 against the outer surface of the inner tube 30.

Figure 3:
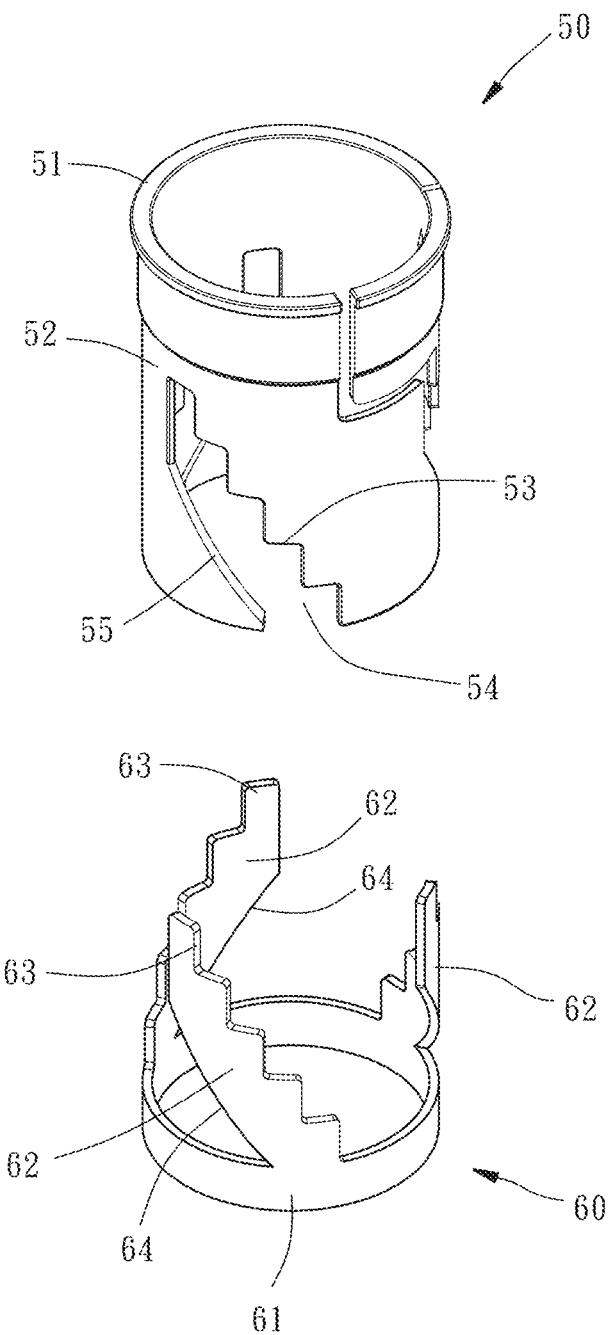
FIG. 3 is an exploded perspective view of a bushing provided by the seat post assembly according to the first embodiment of the present invention.

The bushing 40 has an upper sleeve 50 and a lower sleeve 60, as shown in FIGS. 2 and 3:

The upper sleeve 50 has an upper ring portion 51 and a sleeve portion 52. In this embodiment, the upper ring portion 51 is abutted against the top end surface of the outer tube 20 and penetrated by the inner tube 30 (as shown in FIG. 4) and driven by an external force to rotate relative to the outer tube 20. The sleeve portion 52 integrally extends downward from the bottom edge of the upper ring portion 51 along the axial direction of the inner tube 30. In addition, the sleeve portion 52 further has three guide slots 54 and three first inclined planes 55. Each guide slot 54 extends obliquely upwards from the bottom edge of the sleeve portion 52 around the axial direction of the inner tube 30. The first inclined planes 55 are adjacent to the guiding slots 54 in a one-to-one manner, and each first inclined plane 55 has the same extending direction as the adjacent guiding slot 54.

The lower sleeve 60 has a lower ring portion 61 and three guide arms 62. The lower ring portion 61 is located in the outer tube 20 and movably mounted upwards and downwards on the inner tube 30. The three guide arms 62 integrally extend obliquely upwards from the top edge of the lower ring portion 61 around the axial direction of the inner tube 30. Each guide arm 62 has a second inclined plane 64 on the bottom side thereof.

Figure 5:
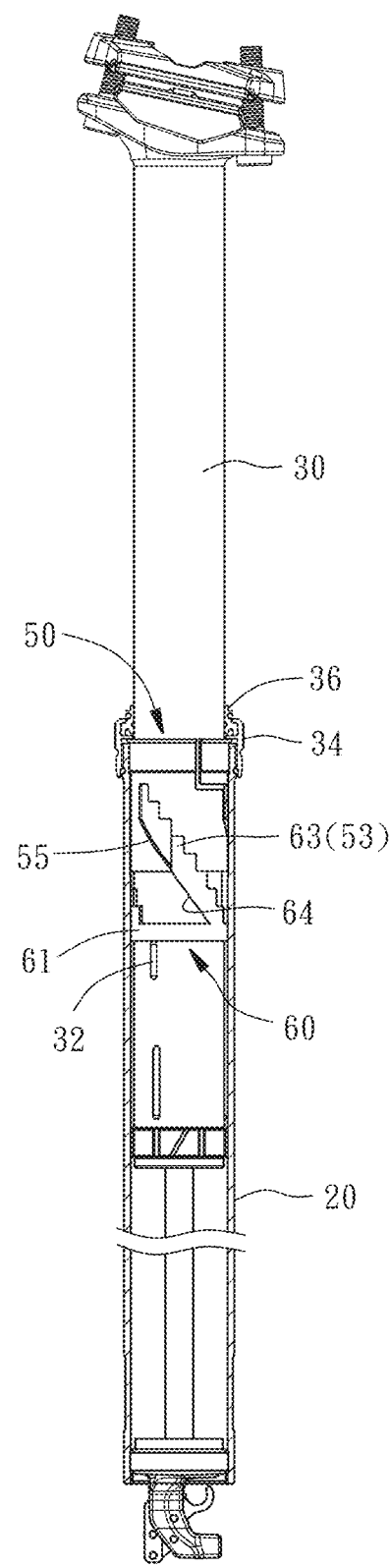
FIG. 5 is similar to FIG. 4, showing the lower sleeve is located at a different height.

In this embodiment, the connecting structure 42 has three set of positioning slots 53 and three set of positioning portions 63. The number of each set of the positioning slots 53 is five (but not limited to this). The three set of the positioning slots 53 are integrally formed on the sleeve portion 52 of the upper sleeve 50 and arranged in an equally-spaced manner around the axis of the inner tube 30. Each set of the positioning slots 53 are arranged in a stepped manner along the axial direction of the inner tube 30 and communicate with the adjacent guiding slot 54 of the upper sleeve 50. The number of the positioning portions 63 is five (but not limited to this). Each set of positioning portions 63 is integrally formed on the top side of the guide arm 62 of the lower sleeve 60. As such, the lower sleeve 60 is assembled with the upper sleeve 50 by using the connecting structure 42, and the lower sleeve 60 can be adjusted upwards and downwards relative to the upper sleeve 50 along the axial direction of the outer tube 20. Further, when the upper sleeve 50 and the lower sleeve 60 are assembled with each other, the three guide arms 62 of the lower sleeve 60 are inserted into the three guide slots 54 of the upper sleeve 50 in a one-to-one manner. On the one hand, the positioning portions 63 are engaged with the positioning grooves 53 in a one-to-one manner, and on the other hand, the second inclined planes 64 are abutted against the first inclined planes 55 in a one-to-one manner. As shown in FIGS. 4 and 5, as long as the lower sleeve 60 is pulled down or pushed up, the position of the lower sleeve 60 relative to the upper sleeve 50 can be changed. However, in fact, the positioning slot 53 can also be provided in the lower sleeve 60, and the positioning portion 63 can also be provided in the upper sleeve 50, that is, the configurations of the positioning slot 53 and the positioning portion 63 can be interchanged, as long as the lower sleeve 60 can be adjusted up and down relative to the upper sleeve 50.

It can be seen from the above that when adjusting the total height of the inner tube 30, a rider removes the cap 34 first, and then pulls upwards a part of the inner tube 30 to expose the bushing 40, and then turns on the pneumatic cylinder 14 to adjust the position of the inner tube 30, and then adjusts the position of the lower sleeve 60 after the inner tube 30 reaches a desired height. At this time, the rider can fine-tune the positions of the inner tube 30 and the lower sleeve 60 according to the actual needs until the bottom surface of the lower ring portion 61 of the lower sleeve 60 is abutted against the protrusions 32 of the inner tube 30. Finally, as shown in FIG. 5, when confirming that the height of the inner tube 30 is correct, the rider installs the bushing 40 back into the outer tube 20 and locks the cap 34 to complete the total height adjustment of the inner tube 30.

After the ride is finished, the rider can turn on the pneumatic cylinder 14 to adjust inner tube 30 to a lowest level for facilitating storage. Because the bushing 40 has been adjusted to the desired position according to the rider's needs, the ascending height of the inner tube 30 will be limited through the cooperation between the protrusions 32 of the inner tube 30 and the lower ring portion 61 of the lower sleeve 60 on the next ride, such that there is no need to readjust the height of the seat cushion for the same rider. This can effectively save operation time and increase the convenience of use.

Figure 6:
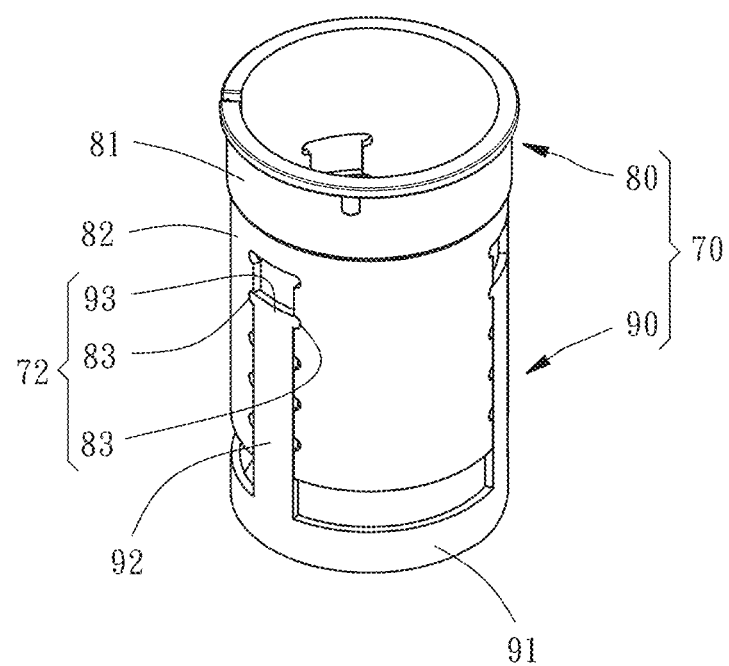
FIG. 6 is a perspective view of the bushing provided by the seat post assembly according to a second embodiment of the present invention.
Figure 7:
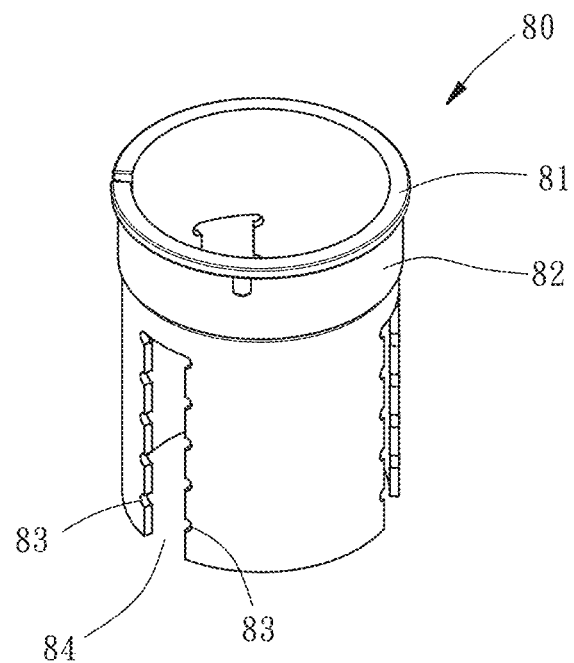
FIG. 7 is an exploded perspective view of the bushing provided by the seat post assembly according to the second embodiment of the present invention.
Figure 7:
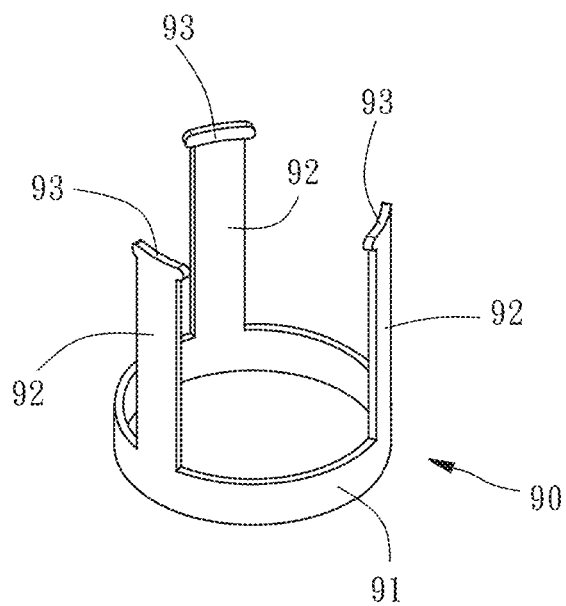

On the other hand, the structure of the present invention can have different changes. As shown in FIGS. 6 and 7, the bushing 70 provided in the second embodiment of the present invention includes an upper sleeve 80 and a lower sleeve 90.

The upper sleeve 80 has an upper ring portion 81 and a sleeve portion 82. The sleeve portion 82 has three guide slots 84. Each guide slot 84 extends straight upwards from the bottom edge of the sleeve portion 82 along the axial direction of the inner tube 30.

The lower sleeve 90 has a lower ring portion 91 and three guiding arms 92. The three guiding arms 92 integrally extend straight upward from the top edge of the lower ring portion 91 along the axial direction of the inner tube 30.

The connecting structure 72 has three set of positioning slots 83 and three horizontal strip-shaped positioning portions 93. Each set of the positioning slots 83 has five pairs and a total of ten (but not limited to this). The three set of the positioning slots 83 are integrally formed on the sleeve portion 82 of the upper sleeve 80. Each set of the positioning slots 83 are disposed in pairs and arranged in an equally-spaced manner along the axial direction of the inner tube 30 and communicate with one of the guide slots 84. The three positioning portions 93 are integrally formed on the top ends of the guide arms 92 of the lower sleeve 90, respectively. However, in fact, the positioning slot 83 and the positioning portion 93 can also be interchanged.

Figure 8:
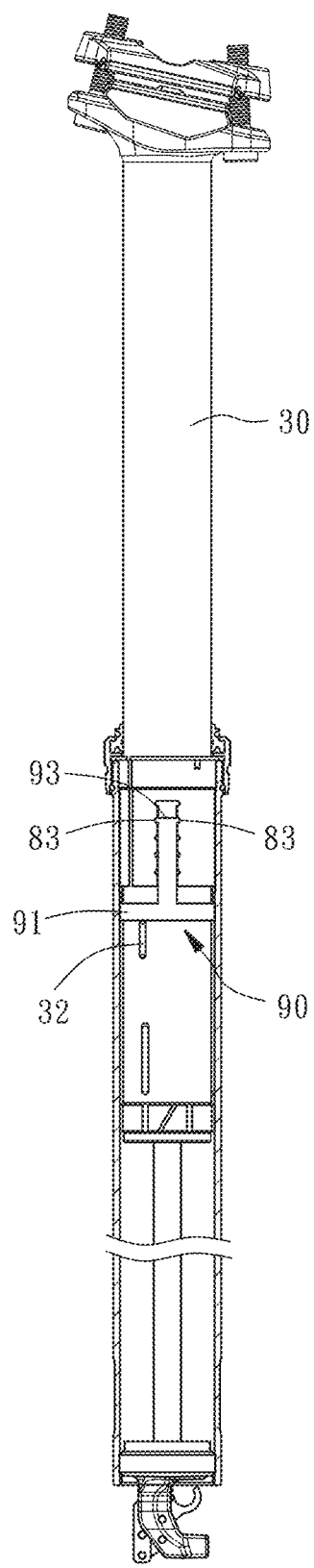
FIG. 8 is a partially sectional view of the seat post assembly according to the second embodiment of the present invention.
Figure 9:
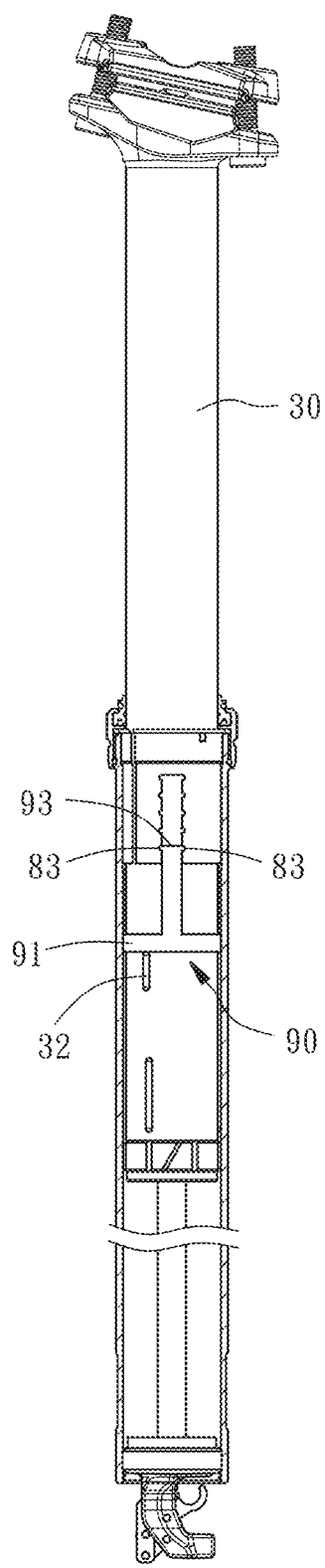
FIG. 9 is similar to FIG. 8, showing the lower sleeve is located at a different height.

By this way, the lower sleeve 90 is assembled with the upper sleeve 80 by using the connecting structure 72, and the lower sleeve 90 can be adjusted upwards and downwards relative to the upper sleeve 80 along the axial direction of the outer tube 20. Further, when the upper sleeve 80 and the lower sleeve 90 are assembled with each other, the three guide arms 92 of the lower sleeve 90 are inserted into the three guide slots 84 of the upper sleeve 80 in a one-to-one manner from bottom to top, so that two ends of each positioning portion 93 are engaged with one pair of the positioning slots 83. As shown in FIGS. 8 and 9, as long as the lower sleeve 90 is pulled down or pushed up, the position of the lower sleeve 90 relative to the upper sleeve 80 can be changed. As such, the ascending height of the inner tube 30 can be restricted by using that the bottom surface of the lower ring portion 91 is abutted against the protrusions 32 of the inner tube 30, thereby achieving the effect of adjusting the total height.

Finally, what needs to be added here is that, in addition to the aforementioned embodiments, the connection structure can also be used with two magnetic elements that attract each other, two male and female fasteners that can be fastened to each other, or two male hook and female loop fasteners that can be repeatedly pasted. Further, the connection structure can also be used with a plurality of concavities and a plurality of convexities that can be engaged with each other. By changing the engagement positions of the concavities and the convexities, the lower sleeve 60 can be adjusted along the axial direction of the outer tube 20 relative to the upper sleeve 50.

What is claimed is:

1. A seat post assembly comprising:
an outer tube;
an inner tube movably disposed upwards and downwards in the outer tube, and having a top end thereof located outside the outer tube and a bottom end thereof received in the outer tube, an outer surface of the bottom end of the inner tube having a protrusion;
a bushing including an upper sleeve disposed on a top end of the outer tube and penetrated by the inner tube, and a lower sleeve received in the outer tube and movably mounted upwards and downwards on the inner tube along an axial direction of the outer tube and having a bottom end thereof abutted against the protrusion of the inner tube; and
a connecting structure provided to the bushing for allowing the lower sleeve to be connected with the upper sleeve and moved along the axial direction of the outer tube relative to the upper sleeve,
wherein the connecting structure includes a plurality of positioning slots arranged in order along an axial direction of the inner tube, and at least one positioning portion alternatively engaged with one of the positioning slots.

2. The seat post assembly as claimed in claim 1, wherein the positioning slots are provided by one of the upper sleeve and the lower sleeve, and the positioning portion is provided by the other of the upper sleeve and the lower sleeve.

3. The seat post assembly as claimed in claim 1, wherein the positioning slots are arranged in a stepped manner along the axial direction of the inner tube; the connecting structure includes a plurality of the positioning portions arranged in a stepped manner along the axial direction of the inner tube and engaged with the positioning slots in a one-to-one manner.

4. The seat post assembly as claimed in claim 3, wherein the upper sleeve includes an upper ring portion abutted against a top end surface of the outer tube and penetrated by the inner tube, and a sleeve portion extending downwards from a bottom edge of the upper ring portion along the axial direction of the inner tube; the positioning slots are provided by the sleeve portion.

5. The seat post assembly as claimed in claim 4, wherein the sleeve portion of the upper sleeve further has a guide slot extending inclinedly upwards from a bottom edge of the sleeve portion around the axial direction of the inner tube and communicating with the positioning slots; the lower sleeve includes a lower ring portion movably mounted upwards and downwards on the inner tube and having a bottom edge thereof abutted against the protrusion of the inner tube, and a guide arm extending upwards from a top edge of the lower ring portion around the axial direction of the inner tube and inserted into the guide slot of the upper sleeve; the positioning portions are provided at a top side of the guide arm.

6. The seat post assembly as claimed in claim 5, wherein the sleeve portion of the upper sleeve further includes a first inclined plane adjacent to the guide slot, and a bottom side of the guide arm of the lower sleeve includes a second inclined plane abutted against the first inclined plane.

7. The seat post assembly as claimed in claim 1, wherein the positioning slots are disposed in pairs and arranged in an equally-spaced manner along the axial direction of the inner tube; the connecting structure includes one said position portion provided with two ends thereof engaged with one pair of the positioning slots.

8. The seat post assembly as claimed in claim 7, wherein the upper sleeve includes an upper ring portion abutted against a top end surface of the outer tube and penetrated by the inner tube, and a sleeve portion extending downwards from a bottom edge of the upper ring portion along the axial direction of the inner tube; the positioning slots are provided by the sleeve portion.

9. The seat post assembly as claimed in claim 8, wherein the sleeve portion of the upper sleeve further has a guide slot extending upwards from a bottom edge of the sleeve portion along the axial direction of the inner tube and communicating with the positioning slots; the lower sleeve includes a lower ring portion movably mounted upwards and downwards on the inner tube and having a bottom edge thereof abutted against the protrusion of the inner tube, and a guide arm extending upwards from a top edge of the lower ring portion along the axial direction of the inner tube and inserted into the guide slot of the upper sleeve; the positioning portion is provided at a top end of the guide arm.

10. A seat post assembly comprising:
an outer tube;
an inner tube movably disposed upwards and downwards in the outer tube, and having a top end thereof located outside the outer tube and a bottom end thereof received in the outer tube, an outer surface of the bottom end of the inner tube having a protrusion;
a bushing including an upper sleeve disposed on a top end of the outer tube and penetrated by the inner tube, and a lower sleeve received in the outer tube and movably mounted upwards and downwards on the inner tube along an axial direction of the outer tube and having a bottom end thereof abutted against the protrusion of the inner tube; and
a connecting structure provided to the bushing for allowing the lower sleeve to be connected with the upper sleeve and moved along the axial direction of the outer tube relative to the upper sleeve,
wherein the connecting structure includes two magnetic elements attracting with each other, one of which is provided to the upper sleeve, and the other of which is provided to the lower sleeve.

11. A seat post assembly comprising:
an outer tube;
an inner tube movably disposed upwards and downwards in the outer tube, and having a top end thereof located outside the outer tube and a bottom end thereof received in the outer tube, an outer surface of the bottom end of the inner tube having a protrusion;
a bushing including an upper sleeve disposed on a top end of the outer tube and penetrated by the inner tube, and a lower sleeve received in the outer tube and movably mounted upwards and downwards on the inner tube along an axial direction of the outer tube and having a bottom end thereof abutted against the protrusion of the inner tube; and
a connecting structure provided to the bushing for allowing the lower sleeve to be connected with the upper sleeve and moved along the axial direction of the outer tube relative to the upper sleeve,
wherein the connecting structure includes a male hook fastener provided to one of the upper sleeve and the lower sleeve, and a female loop fastener provided to the other of the upper sleeve and the lower sleeve.

* * * * *